US010104066B2

(12) United States Patent
Zhang

(10) Patent No.: US 10,104,066 B2
(45) Date of Patent: *Oct. 16, 2018

(54) USER LOGIN METHODS, DEVICES, AND SYSTEMS

(71) Applicant: TENCENT TECHNOLOGY (SHENZHEN) COMPANY LIMITED, Shenzhen (CN)

(72) Inventor: Lei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,002

(22) Filed: Jan. 23, 2017

(65) Prior Publication Data
US 2017/0163628 A1  Jun. 8, 2017

Related U.S. Application Data

(63) Continuation of application No. 14/427,179, filed as application No. PCT/CN2014/081342 on Jul. 1, 2014, now Pat. No. 9,602,502.

(30) Foreign Application Priority Data

Jul. 2, 2013  (CN) .......................... 2013 1 0275044

(51) Int. Cl.
H04L 29/06 (2006.01)
H04W 12/06 (2009.01)
(Continued)

(52) U.S. Cl.
CPC .......... *H04L 63/083* (2013.01); *G06F 3/0482* (2013.01); *G06F 3/04817* (2013.01);
(Continued)

(58) Field of Classification Search
CPC . H04L 67/306; H04L 63/083; H04L 63/0876; H04L 63/102; G06F 21/00;
(Continued)

(56) References Cited

U.S. PATENT DOCUMENTS 8,789,147 B1    7/2014  Agarwal et al.
2005/0091213 A1*  4/2005  Schutz ................. G06F 21/31
(Continued)

FOREIGN PATENT DOCUMENTS

CN       1829202 A    9/2006
CN       102387156 A  3/2012
(Continued)

OTHER PUBLICATIONS

Valentino-DeVries, Unique Phone ID Numbers Explained, Dec. 19, 2010, WSJ, 2 Pages (Year: 2010).*
(Continued)

*Primary Examiner* — Christopher C Harris
(74) *Attorney, Agent, or Firm* — Anova Law Group, PLLC

(57) ABSTRACT

A user login method for use in a terminal is provided. The method includes: receiving an automatic login request; acquiring a terminal identifier of the terminal; sending, to a server, a query request about a user account associated with the terminal identifier and a password corresponding to the user account, the query request including the terminal identifier; receiving, from the server, a query result based on the query request; selecting a user account from the query result and a password corresponding to the selected user account, if the query result is not empty; and sending, to the server, the selected user account and the corresponding password, for the selected user account to login after authentication by the server.

17 Claims, 6 Drawing Sheets

(51) Int. Cl.
  *G06F 17/30* (2006.01)
  *H04L 29/08* (2006.01)
  *G06F 3/0481* (2013.01)
  *G06F 3/0482* (2013.01)

(52) U.S. Cl.
  CPC .... *G06F 17/30867* (2013.01); *H04L 63/0876* (2013.01); *H04L 63/102* (2013.01); *H04L 67/306* (2013.01); *H04W 12/06* (2013.01)

(58) Field of Classification Search
  CPC ............... G06F 3/04817; G06F 3/0482; G06F 17/30867; H04W 12/06
  See application file for complete search history.

(56) References Cited

U.S. PATENT DOCUMENTS

| | | |
|---|---|---|
| 2007/0101008 A1 | 5/2007 | Gomez |
| 2008/0046983 A1* | 2/2008 | Lester ..................... G06F 21/31 726/5 |
| 2010/0043062 A1 | 2/2010 | Alexander |
| 2010/0287606 A1 | 11/2010 | Machani |
| 2011/0099612 A1 | 4/2011 | Lee et al. |
| 2011/0111737 A1* | 5/2011 | Abbott ..................... H04L 51/32 455/414.1 |
| 2011/0287739 A1 | 11/2011 | Cajigas Bringas et al. |
| 2012/0011577 A1 | 1/2012 | Mashimo |
| 2013/0166918 A1 | 6/2013 | Shahbazi |
| 2013/0198832 A1* | 8/2013 | Draluk ..................... G06F 21/31 726/16 |
| 2014/0137220 A1* | 5/2014 | Niemela ............... H04L 63/083 726/6 |
| 2014/0173708 A1 | 6/2014 | Garlick |
| 2014/0282949 A1 | 9/2014 | Nath et al. |

FOREIGN PATENT DOCUMENTS

| | | |
|---|---|---|
| CN | 102497635 A | 6/2012 |
| CN | 102882848 A | 1/2013 |
| CN | 102970587 A | 3/2013 |
| CN | 103001934 A | 3/2013 |
| CN | 103152402 A | 6/2013 |
| CN | 103176800 A | 6/2013 |
| WO | 2006101561 A2 | 9/2006 |

OTHER PUBLICATIONS

The State Intellectual Property Office of the People's Republic of China (SIPO) Office Action 1 for 201310275044.0 dated Apr. 3, 2018 6 Pages (Including translation).

* cited by examiner

USER LOGIN METHODS, DEVICES, AND SYSTEMS

CROSS REFERENCE TO RELATED APPLICATIONS

This application is a continuation application of U.S. patent application Ser. No. 14/427,179, filed on Mar. 10, 2015. U.S. patent application Ser. No. 14/427,179 is a national stage entry of PCT Patent Application No. PCT/CN2014/081342, filed on Jul. 1, 2014, which claims priority to Chinese Patent Application No. 201310275044.0, filed Jul. 2, 2013, the entire contents of all of which are incorporated herein by reference.

TECHNICAL FIELD

The present disclosure generally relates to the field of mobile communication technology and, more particularly, to user login methods, devices, and systems.

BACKGROUND

With the functional enhancement of mobile terminals, popularization of wireless networks, and the abundance of Internet information, more and more users of mobile terminals, such as mobile phones, are connecting to the Internet through wireless connections to use software applications or websites, and communicate using instant messaging (IM) or other communications applications. Each of these applications or websites typically requires the user to enter a password or other authentication information in order to access the user's account and use the application or website. Although users often use the same mobile terminal to log into these various applications and websites, users must input account information and/or authentication information each time the user attempts to access something, which increases the user's input operations on the terminal and may affect standby time of the mobile terminal.

SUMMARY

According to a first aspect of the present disclosure, there is provided a user login method for use in a terminal, comprising: receiving an automatic login request; acquiring a terminal identifier of the terminal; sending, to a server, a query request about a user account associated with the terminal identifier and a password corresponding to the user account, the query request including the terminal identifier; receiving, from the server, a query result based on the query request; selecting a user account from the query result and a password corresponding to the selected user account, if the query result is not empty; and sending, to the server, the selected user account and the corresponding password, for the selected user account to login after authentication by the server.

According to a second aspect of the present disclosure, there is provided a terminal, comprising: a processor; and a memory for storing instructions executable by the processor; wherein the processor is configured to: receive an automatic login request; acquire a terminal identifier of the terminal; send, to a server, a query request about a user account associated with the terminal identifier and a password corresponding to the user account, the query request including the terminal identifier; receive, from the server, a query result based on the query request; select a user account from the query result and a password corresponding to the selected user account, if the query result is not empty; and send, to the server, the selected user account and the corresponding password, for the selected user account to login after authentication by the server.

According to a third aspect of the present disclosure, there is provided a user login system, comprising: a server; and a mobile terminal; wherein: the mobile terminal is configured to receive an automatic login request, acquire a terminal identifier of the mobile terminal, and send a query request about a user account associated with the terminal identifier and a password corresponding to the user account, the query request including the terminal identifier; the server is configured to perform, based on the terminal identifier, a query of a user account associated with the terminal identifier and a password corresponding to the user account, and return the query result to the mobile terminal; the mobile terminal is further configured to receive the query result, select a user account from the query result and the password corresponding to the selected user account, if the query result is not empty, and send the selected user account and the corresponding password to the server; and the server is further configured to perform user login authentication according to the selected user account and the corresponding password.

It is to be understood that both the foregoing general description and the following detailed description are exemplary and explanatory only and are not restrictive of the invention, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the inventions. Instead, they are merely examples of apparatuses and methods consistent with aspects related to the inventions as recited in the appended claims.

Figure 1:
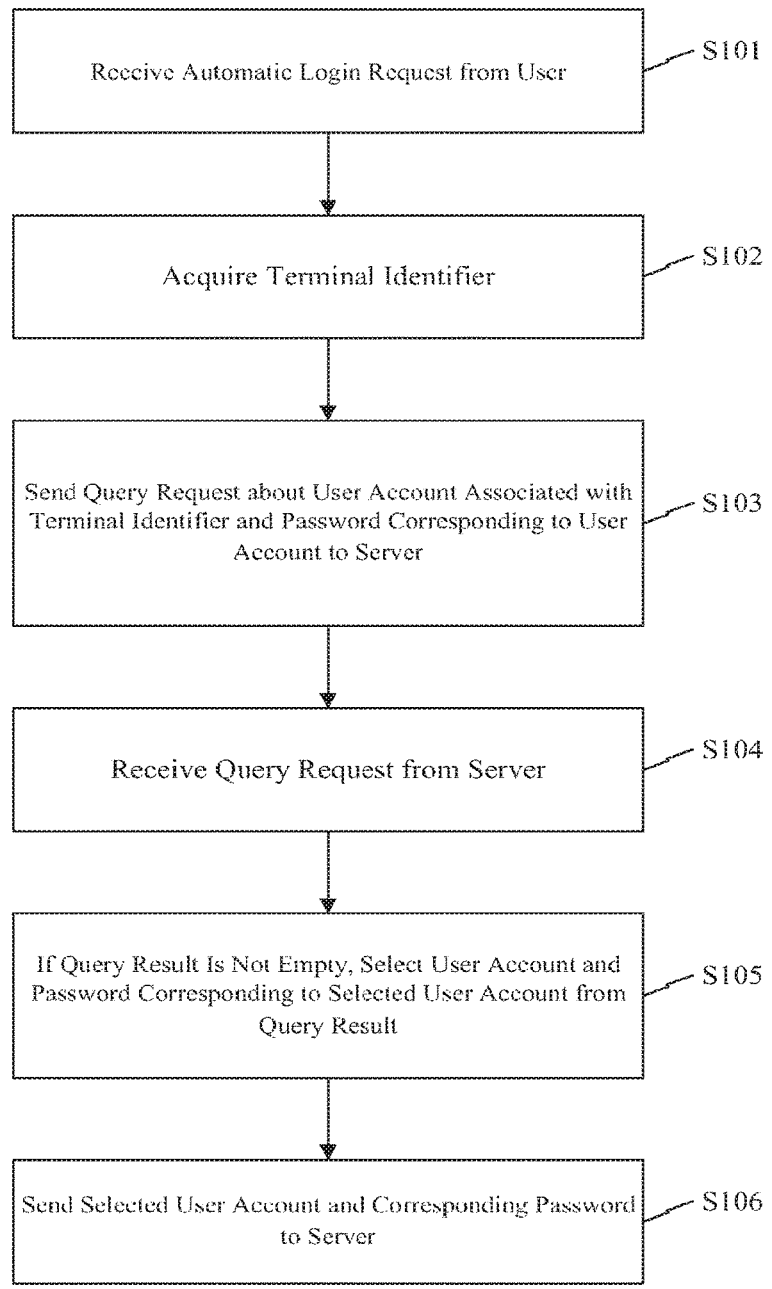
FIG. 1 is a flowchart of a user login method, according to an exemplary embodiment.

FIG. 1 is a flowchart of a user login method 100 for use in a device, such as a mobile terminal, according to an exemplary embodiment. Referring to FIG. 1, the method 100 includes the following steps.

In step S101, the mobile terminal receives an automatic login request from a user. For example, the mobile terminal receives the automatic login request through a website or a software application installed on the mobile terminal, e.g., an instant messaging (IM) application, a microblog, a WeChat application, a networking space, etc. The automatic login request includes a target server identifier, which can be the identifier of a server for the software or for the website. The server stores binding information regarding a terminal identifier of the mobile terminal, a user account associated with the terminal identifier, and a password of the user account. The server can perform a query of the user account associated with the terminal identifier and the password of the user account from the binding information, according to the terminal identifier.

In exemplary embodiments, the password is an encrypted password. If the mobile terminal is a mobile phone, the terminal identifier can be a serial number, an international mobile equipment identity (IMEI), a mobile equipment identifier (MEI), or a wireless media access control (MAC) address, etc. of the mobile phone. A mobile phone number can also be used as the terminal identifier.

For example, the binding information regarding the terminal identifier, the user account, and the password can be stored as shown in Table 1 below.

TABLE 1

| Terminal Identifier | User Account | Password |
|---|---|---|
| A000002EDD007E | 78394015 | 385ad8ce83be99f1e6b3410b8ad7e4e7 |
| E00DF002EFGGGE | 25893145 | 565ad8cedfddfg99f1e6b3fdffgdfgdf |

In step S102, the mobile terminal acquires the terminal identifier. Different mobile terminals may acquire terminal identifiers in different manners. For example, if the mobile terminal's serial number is used as the terminal identifier, which is generally provided on the back of the mobile terminal, and stored in a primary memory of the mobile terminal, the mobile terminal can acquire its serial number through calling a predefined application programming interface (API) function.

In step S103, the mobile terminal sends a query request about a user account associated with the terminal identifier and the password corresponding to the user account to the server. For example, the query request includes the terminal identifier of the mobile terminal. Because the server may store binding information regarding the terminal identifier of the mobile terminal, the user account, and the password of the user account, the server can perform a query of the user account associated with the terminal identifier and the password corresponding to the user account. For example, assuming that the terminal identifier acquired in step S102 is "A000002EDD007E," as shown in Table 1, the server can perform a query, based on the terminal identifier "A000002EDD007E," and find that the user account corresponding to the software or website and associated with the mobile terminal is "78394015," and the encrypted password of the user account is "385ad8ce83be99f1e6b3410b8ad7e4e7."

In step S104, the mobile terminal receives a query result from the server. For example, the server returns the query result to the mobile terminal, and the mobile terminal can perform user login authentication after receiving the query result.

In step S105, if the query result is not empty, the mobile terminal selects the user account and the password corresponding to the selected user account from the query result. In the illustrated embodiment, the server acquires the user account and the encrypted password corresponding to the user account based on the terminal identifier. If the query result is not empty, the query result will include the user account and password information. Accordingly, the mobile terminal can select the user account and the corresponding password from the query result.

In one exemplary embodiment, an account selection control element can be created in the mobile terminal prior to selecting the user account and corresponding password from the query result, and is configured to receive a user account selected by a user from the query result.

Figure 3A:
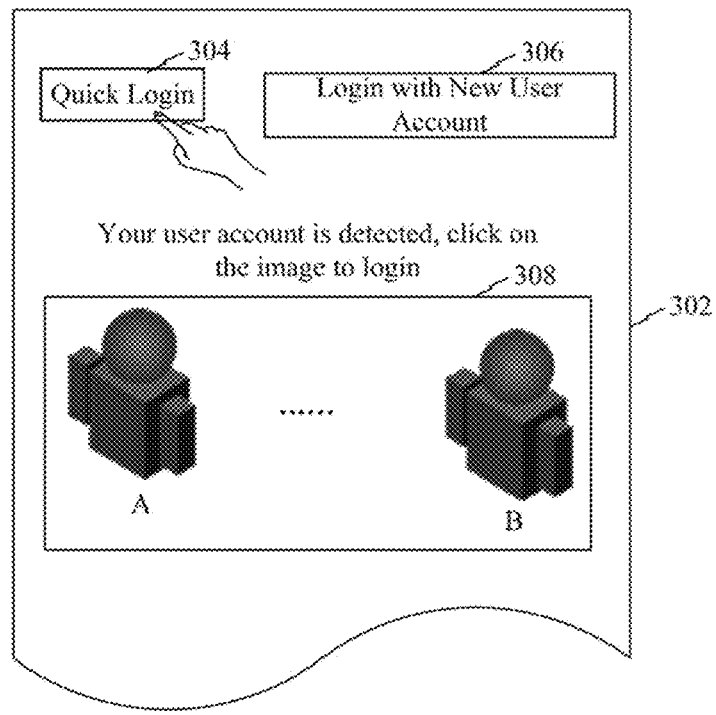
FIG. 3A is a diagram of a login interface when a quick login option of an account selection control element is selected, according to an exemplary embodiment.

FIG. 3A is a diagram of a login interface 302 including an account selection control element 308, according to an exemplary embodiment. For example, the account selection control element 308 is an icon selection control element including at least one user account for the user's selection and a cartoon image corresponding to the user account, so that the user can select the cartoon image for the mobile terminal to acquire the user account corresponding to the selected cartoon image. FIG. 3A will be further described below.

Accordingly, the mobile terminal detects an account selection signal generated from the account selection control element, and acquires the selected user account from the account selection control element. The mobile terminal further acquires the password corresponding to the selected user account from the query result.

Referring back to FIG. 1, in step S106, the mobile terminal sends the selected user account and the corresponding password to the server, so that the server can authenticate login of the selected user account.

The method 100 can reduce the user's input operation, thereby extending a standby time of the mobile terminal and saving energy. Moreover, because multiple software applications or websites may share the same server and the same set of user account and password, the method 100 can avoid using a process communication to detect user accounts of other software applications or websites, which can reduce a workload of the mobile terminal and further extend the standby time of the mobile terminal.

Figure 2:
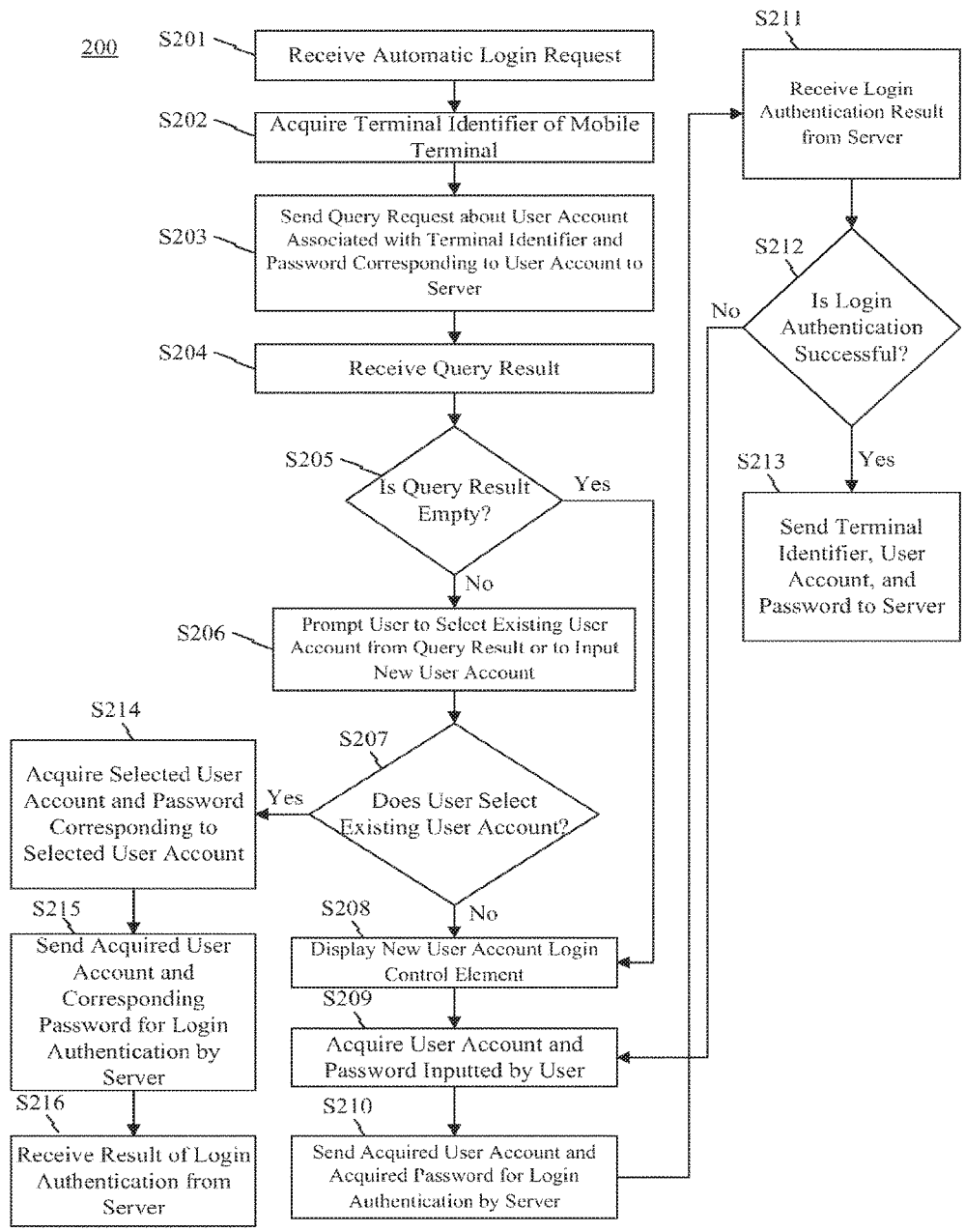
FIG. 2 is a flowchart of a user login method, according to an exemplary embodiment.

FIG. 2 is a flowchart of a user login method 200 for use in a device, such as a mobile terminal, according to an exemplary embodiment. Referring to FIG. 2, the method 200 includes the following steps.

In step S201, the mobile terminal receives an automatic login request.

In step S202, the mobile terminal acquires a terminal identifier of the mobile terminal.

In step S203, the mobile terminal sends a query request about a user account associated with the terminal identifier and a password corresponding to the user account to the server.

In step S204, the mobile terminal receives a query result. Steps S201 to S204 are similar to steps S101 to S104, respectively.

In step S205, the mobile terminal determines whether the query result is empty and, if yes, performs step S208, otherwise, performs step S206. If the query result is empty, it indicates that the mobile terminal does not bind with a user account or that the query fails.

In step S206, the mobile terminal prompts the user to select an existing user account from the query result or to input a new user account in a login interface. Accordingly, the user can login by directly using the bound user account. As a result, the user's input operations can be reduced. If the user wants to login by using an unbound user account, or another user is using the user's mobile terminal to login the other user's user account, the mobile terminal can further display a pop-up control element for popping up a new user login control element in the login interface, and the new user login control element is configured to receive a new user account and a corresponding password.

Figure 3B:
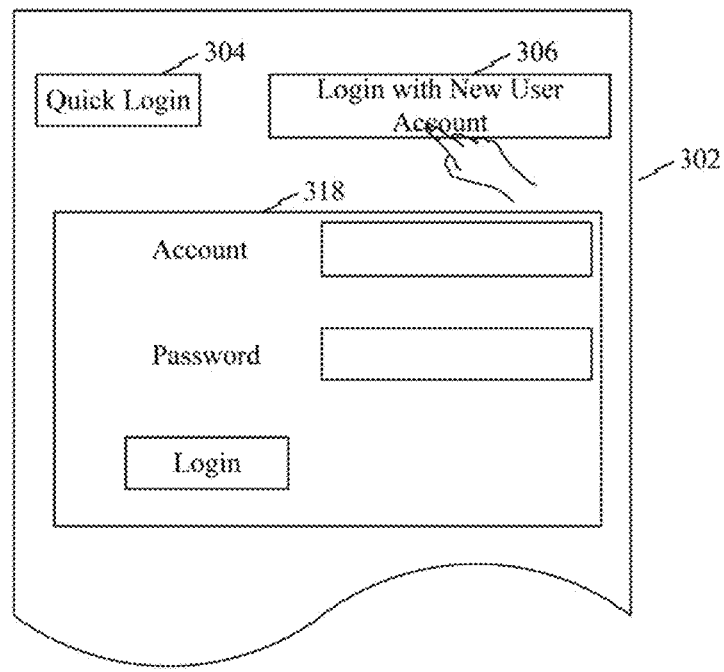
FIG. 3B is a diagram of a login interface when a new login option of the account selection control element is selected, according to an exemplary embodiment.

For example, FIGS. 3A and 3B are diagrams of a login interface 302, according to an exemplary embodiment. Referring to FIGS. 3A and 3B, the login interface 302 includes a first button, e.g., a "Quick Login" button 304, for automatic login by the direct use of a bound user account, and a second button, e.g., a "Login with New User Account" button 306 for login by using a user account that is not bound with the mobile terminal. When the user clicks the "Quick Login" button 304, as shown in FIG. 3A, the mobile terminal displays the account selection control element 308, as described above. When the user clicks the "Login with New User Account" button 314, the mobile terminal displays a new user account login control element 318.

Referring back to FIG. 2, in step S207, the mobile terminal determines whether the user selects the existing user account and, if yes, performs step S214, otherwise performs steps S208. For example, when the user clicks the "Quick Login" button 304 (FIG. 3A), the mobile terminal performs step S214, otherwise, performs step S208.

In step S208, the mobile terminal displays the new user account login control element. For example, when the user clicks the "Login with Other User Account" button 306 (FIG. 3B), the mobile terminal displays the new user account login control element 318.

In step S209, the mobile terminal acquires a user account and a corresponding password inputted by the user. For example, when the user clicks the "Login" button in the login interface 302 (FIG. 3B), the mobile terminal acquires the user account from the corresponding input box, and acquires the password inputted by the user from the corresponding input box. In one exemplary embodiment, the mobile terminal encrypts the acquired password.

In step S210, the mobile terminal sends the acquired user account and the acquired password for login authentication by the server.

In step S211, the mobile terminal receives a login authentication result from the server.

In step S212, the mobile terminal determines whether the login authentication is successful and, if yes, performs step S213, otherwise performs step S209.

In step S213, the mobile terminal sends the terminal identifier, the user account, and the corresponding password to the server.

In steps S208-S213, the user account is not bound with the mobile terminal, and the server does not store binding information regarding the terminal identifier of the mobile terminal, the user account, and the password. To enable the user account to realize user login authentication on the mobile terminal, the mobile terminal sends the terminal identifier, the user account, and the corresponding password to the server, for the server to create new binding information that includes the terminal identifier, the user account, and the corresponding password. This procedure is not mandatory, and an option can be provided in the login interface for the user to choose whether or not bind the user account with the mobile terminal.

In step S214, if the mobile terminal determines that the user selects an existing user account, the mobile terminal acquires the selected user account and the password corresponding to the selected user account. For example, when the user clicks the "Quick Login" button 304 (FIG. 3A), the mobile terminal displays the account selection control element 308 (FIG. 3A). When the user further selects an icon corresponding to the user account A, the mobile terminal acquires the user account A. Because the query result includes the password corresponding to the user account A, the mobile terminal can search the query result for the password corresponding to the user account A.

In step S215, the mobile terminal sends the selected user account and the corresponding password for login authentication by the server.

In step S216, the mobile terminal receives a result of the login authentication returned from the server.

In the method 200, when the user account is not bound with the mobile terminal or the user uses a new user account to login from the mobile terminal, the user account can be bound with the mobile terminal, which makes the use operation convenient, increases a subsequent automatic login probability from the mobile terminal, and thus further extends the standby time of the mobile terminal.

Figure 4:
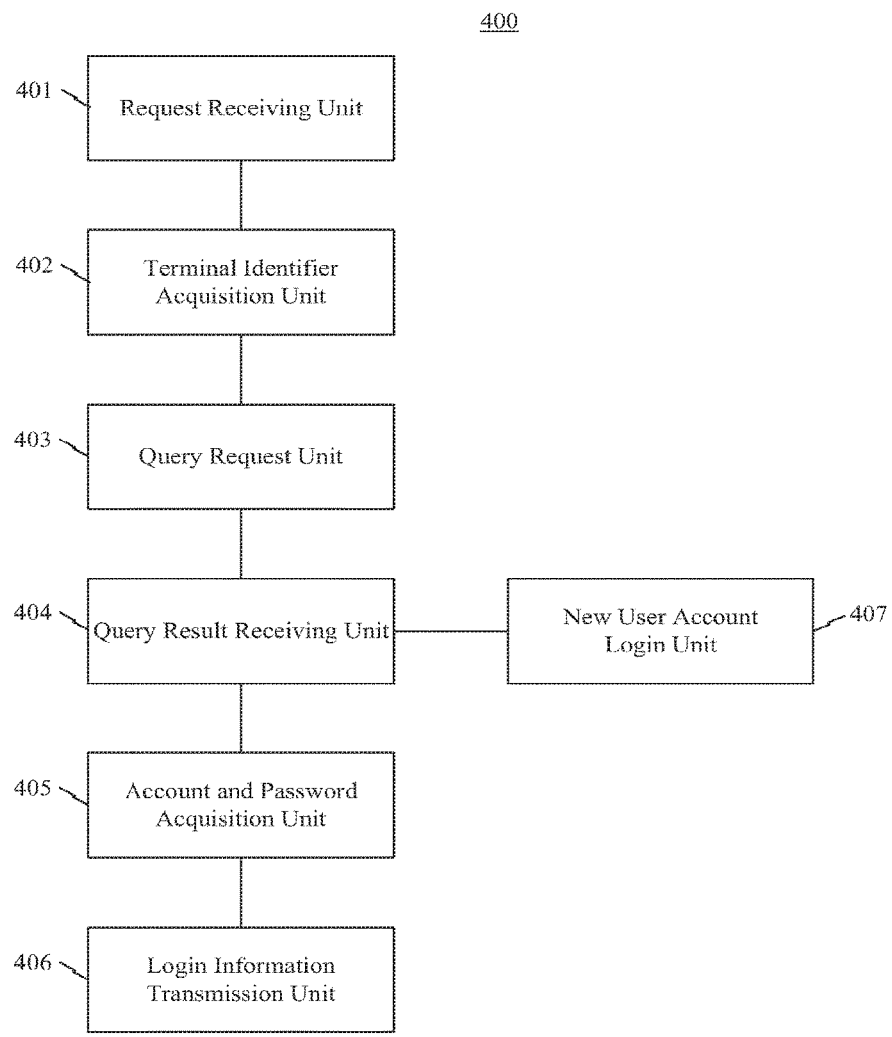
FIG. 4 is a block diagram of a device, according to an exemplary embodiment.

FIG. 4 is a block diagram of a device 400, according to an exemplary embodiment. Referring to FIG. 4, the device 400 may include a request receiving unit 401 configured to receive an automatic login request, a terminal identifier acquisition unit 402 configured to acquire a terminal identifier of the device 400, a query request unit 403 configured to send a query request regarding a user account associated with the terminal identifier and a password corresponding to the user account, and a query result receiving unit 404 configured to receive a query result.

The device 400 may also include an account and password acquisition unit 405 configured to select, from the query result, a user account and a password corresponding to the selected user account, if the query result is not empty, a login information transmission unit 406 configured to send the user account and the password to the server.

In exemplary embodiments, if the query result is not empty, the account and password acquisition unit 405 displays an account selection control element in a login interface, the account selection control element being configured to receive a user selection of a user account in the query result. The account and password acquisition unit 405 also detects an account selection signal that acts on the account selection control element, acquires the selected user account from the account selection control element, and acquires the password corresponding to the selected user account from the query result.

The device 400 may also include a new user account login unit 407 configured to display, if the query result is not empty, a pop-up control element for popping up a new user account login control element in the login interface. If the pop-up control element receives a trigger signal, the new user account login control element will be displayed for receiving a new user account and a corresponding password. In addition, if the query result is empty, the new user account login control element can also be displayed in the login interface. After the new user login control element is displayed, a new user account login request signal that acts on the new user account login control element can be detected. Accordingly, the user account and the corresponding password are acquired from the new user account login control element. The acquired user account and the acquired password are sent to the server for login authentication. Further, if successful login information is received from the server, the new user account login unit 407 can send the terminal identifier, the acquired user name, and the acquired password to the server to store.

The device 400 can reduce the user's input operations, thereby extending the standby time of the device 400 and saving energy. Moreover, because multiple software applications or websites may share the same server and the same set of user account and password, the device 400 can avoid using a process communication to detect user accounts of other software applications or websites, which can reduce a workload of the device 400 and further extend the standby time of the device 400.

Figure 5:
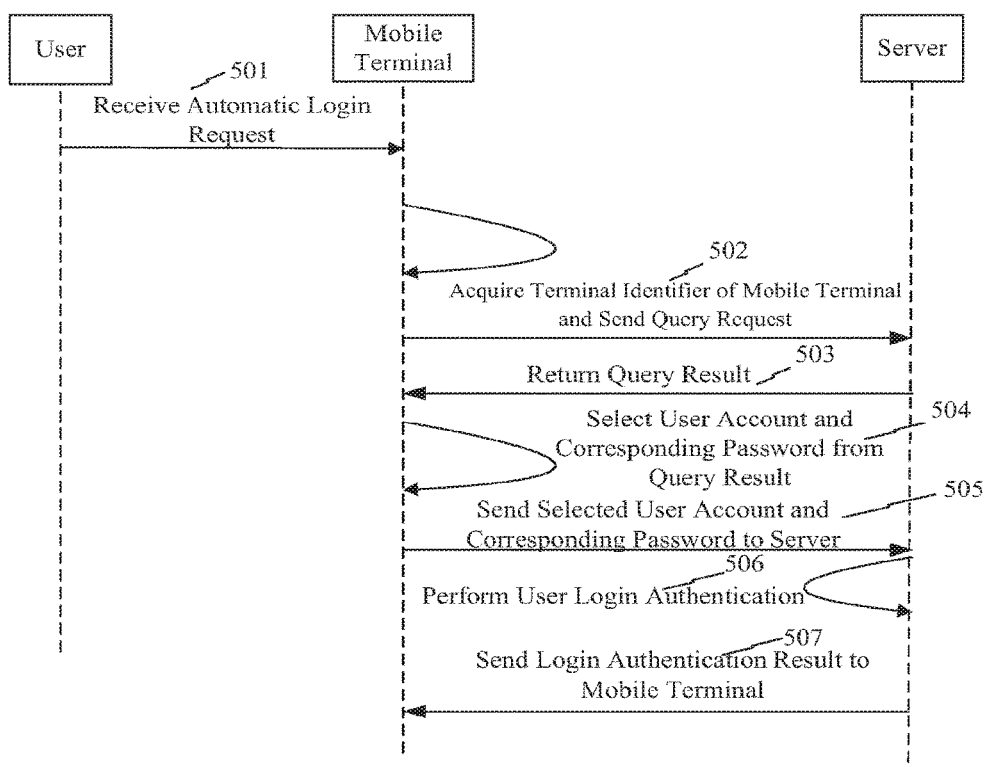
FIG. 5 is a diagram of a user login method in a system, according to an exemplary embodiment.

FIG. 5 is a diagram of a method 500 for use in a system includes at least one server and at least one mobile terminal, according to an exemplary embodiment. Referring to FIG. 5, the mobile terminal receives an automatic login request from a user (501). The mobile terminal also acquires a terminal identifier of the mobile terminal, and sends a query request about a user account associated with the terminal identifier and a password of the user account to the server (502), the query request including the terminal identifier of the mobile terminal.

The server performs, based on the terminal identifier, a query of a user account associated with the terminal identifier and a password corresponding to the user account, and returns a query result to the mobile terminal (503).

The mobile terminal receives the query result. If the query result is not empty, the mobile terminal selects, from the query result, a user account and a password corresponding to the selected user account (504), and sends the selected user account and the corresponding password to the server (505).

The server performs user login authentication according to the selected user account and the corresponding password (506) and sends a login authentication result to the mobile terminal (507), for the selected user account to login.

In exemplary embodiments, the mobile terminal is configured to perform the above described user login methods 100 (FIG. 1) and 200 (FIG. 2).

Figure 6:
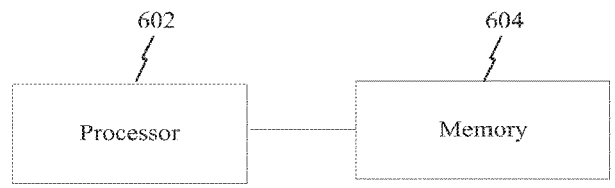
FIG. 6 is a block diagram of a device, according to an exemplary embodiment.

FIG. 6 is a block diagram of a mobile terminal 600, according to an exemplary embodiment. Referring to FIG. 6, the mobile terminal 600 includes a processor 602, and a memory 604 for storing data as well as for storing instructions for performing the above described user login methods, and otherwise facilitating operation of the processor 602.

In exemplary embodiments, there is also provided a non-transitory computer-readable storage medium including instructions, such as included in the memory 604, executable by the processor 602, for performing the above-described user login methods. For example, the storage medium can be a hard drive, a CD-ROM, a floppy disk, etc.

One of ordinary skill in the art will understand that the above described units can each be implemented by hardware, or software, a combination of hardware and software. One of ordinary skill in the art will also understand that multiple ones of the above described units may be combined as one unit, and each of the above described units may be further divided into a plurality of sub-units.

Other embodiments of the inventions will be apparent to those skilled in the art from consideration of the specification and practice of the inventions disclosed here. This application is intended to cover any variations, uses, or adaptations of the inventions following the general principles thereof and including such departures from the present disclosure as come within known or customary practice in the art. It is intended that the specification and examples be considered as exemplary only, with a true scope and spirit of the inventions being indicated by the following claims.

It will be appreciated that the present inventions are not limited to the exact construction that has been described above and illustrated in the accompanying drawings, and that various modifications and changes can be made without departing from the scope thereof. It is intended that the scope of the inventions only be limited by the appended claims.

What is claimed is:

1. A user login method for use in a terminal, comprising:
receiving, by the terminal, an automatic login request initiated on the terminal;
obtaining locally through a predefined application programming interface (API) function by the terminal, a terminal identifier of the terminal;
sending, by the terminal, to a server, a query request about a user account associated with the terminal identifier and a password corresponding to the user account, the query request including the terminal identifier, wherein a binding information including the terminal identifier of the terminal, the user account and the password corresponding to the user account is stored in the server, wherein the query request includes the terminal identifier of the terminal;
receiving, by the terminal, from the server, a query result based on the query request, wherein when the binding information is found in the server, the query result is not empty, and when the binding information is not found in the server, the query result is empty, wherein the password is received encrypted from the server;
displaying, by the terminal, one or more icons on a login interface for user selection when the query result is not empty, each icon corresponding to a user account bound with the terminal identifier from the query result, comprising:
displaying, by the terminal on the login interface, a first option to login with a bound user account and a second option to login with a new user account; and
displaying, by the terminal, the one or more icons on the login interface for user selection when the first option is activated;
selecting, by the terminal, a user account from the query result and a password corresponding to the selected user account according to a selected icon on the login interface; and
sending, by the terminal, to the server, the selected user account and the corresponding password, for the selected user account to login after authentication by the server; and
receiving, by the terminal, information indicating successful login returned from the server after the authentication;
wherein when the terminal is a mobile phone, the terminal identifier comprises an international mobile equipment identity (IMEI) of the mobile phone.

2. The user login method according to claim 1, wherein displaying, by the terminal, the one or more icons on the login interface for user selection when the first option is activated further comprises:
creating, by the terminal, an account selection control element on the login interface; and
sending, by the terminal, the one or more user accounts in the query result to the account selection control element;
wherein the account selection control element includes the one or more icons corresponding to the one or more user accounts.

3. The user login method according to claim 2, wherein selecting the user account and the password comprises:

detecting whether an account selection signal corresponding to the selected icon is generated from the account selection control element;

acquiring the selected user account from the account selection control element if the account selection signal is detected; and acquiring the password corresponding to the selected user account in the query result.

4. The user login method according to claim 1, further comprising:

displaying, by the terminal, a new user account login control element on the login interface when the second option is activated;

wherein the new user account login control element is configured to receive a new user account and a corresponding password.

5. The user login method according to claim 4, further comprising:

detecting, by the terminal, whether a new user account login request signal is generated from the new user account login control element;

acquiring, by the terminal, the new user account and the corresponding password from the new user account login control element, when the new user account login request signal is detected; and sending, by the terminal, the acquired user account and the acquired password to the server for login after authentication by the server.

6. The user login method according to claim 5, wherein the server authenticates the acquired user account and the acquired password, and the method further comprises:

receiving, by the terminal, information indicating successful login returned from the server after the authentication; and sending, by the terminal, the terminal identifier, the acquired user name, and the acquired password to the server, wherein the server binds and stores the terminal identifier, the acquired user name, and the acquired password.

7. The user login method according to claim 6, wherein sending, by the terminal, the terminal identifier, the acquired user name, and the acquired password to the server further comprises:

providing, by the terminal, an option in the login interface for the user to choose whether to bind the new user account and the corresponding password of the new user account with the terminal;

receiving, by the terminal, a signal from the login interface indicating the user chooses to bind the new user account with the terminal; and when the signal is received, sending, by the terminal, the terminal identifier, the acquired user name, and the acquired password to the server.

8. The user login method according to claim 4, further comprising:

displaying, by the terminal, the new user account login control element on the login interface when the query result is empty.

9. A terminal for user login, comprising: at least one processor; and a memory for storing instructions executable by the at least one processor causing the processor to:

receive an automatic login request initiated on the terminal;

obtain locally through a predefined application programming interface (API) function a terminal identifier of the terminal;

send, to a server, a query request about a user account associated with the terminal identifier and a password corresponding to the user account, the query request including the terminal identifier, wherein a binding information including the terminal identifier of the terminal, the user account and the password corresponding to the user account is stored in the server;

receive, from the server, a query result based on the query request, wherein when the binding information is found in the server, the query result is not empty, and when the binding information is not found in the server, the query result is empty, wherein the password is received encrypted from the server;

display one or more icons on a login interface for user selection, each icon corresponding to a user account bound with the terminal identifier from the query result, wherein:

the login interfaces displays a first option to login with a bound user account and a second option to login with a new user account when the query result is not empty;

display the one or more icons on the login interface for user selection when the first option is activated;

select a user account from the query result and a password corresponding to the selected user account according to a selected icon on the login interface; and send, to the server, the selected user account and the corresponding password, for the selected user account to login after authentication by the server; and receiving, by the terminal, information indicating successful login returned from the server after the authentication;

wherein when the terminal is a mobile phone, the terminal identifier comprises an international mobile equipment identity (IMEI) of the mobile phone.

10. The terminal according to claim 9, wherein the at least one processor is further configured to:

create an account selection control element on the login interface when the first option is activated; and send the one or more user accounts in the query result to the account selection control element, wherein the account selection control element includes the one or more icons corresponding to the one or more user accounts.

11. The terminal according to claim 10, wherein the at least one processor is further configured to:

detect whether an account selection signal corresponding to the selected icon is generated from the account selection control element;

acquire the selected user account from the account selection control element if the account selection signal is detected; and acquire the password corresponding to the selected user account in the query result.

12. The terminal according to claim 9, wherein the at least one processor is further configured to:

display a new user account login control element on the login interface when the second option is activated;

wherein the new user account login control element is configured to receive a new user account and a corresponding password.

13. The terminal according to claim 12, wherein the at least one processor is further configured to:

detect whether a new user account login request signal is generated from the new user account login control element;

acquire the new user account and the corresponding password from the new user account login control element, when the new user account login request signal is detected; and send the acquired user account and the acquired password to the server for login after authentication by the server.

14. The terminal according to claim 13, wherein the server authenticates the acquired user account and the acquired password, and the at least one processor is further configured to:

receive information indicating successful login returned from the server after the authentication; and send the terminal identifier, the acquired user name, and the acquired password to the server, wherein the server binds and stores the terminal identifier, the acquired user name, and the acquired password.

15. The terminal according to claim 14, wherein the at least one processor is further configured to:

provide an option in the login interface for the user to choose whether to bind the new user account and the corresponding password of the new user account with the terminal;

receive a signal from the login interface indicating the user chooses to bind the new user account with the terminal; and when the signal is received, send, to the server, the terminal identifier, the acquired user name, and the acquired password.

16. The terminal according to claim 12, wherein the at least one processor is further configured to:

display the new user account login control element on the login interface when the query result is empty.

17. The user login method according to claim 1, wherein the server and the binding information stored in the server are shared by a plurality of software applications.

* * * * *